L. F. SCHMIDT.
CLUTCH BOLT.
APPLICATION FILED MAY 20, 1909.
953,298.
Patented Mar. 29, 1910.
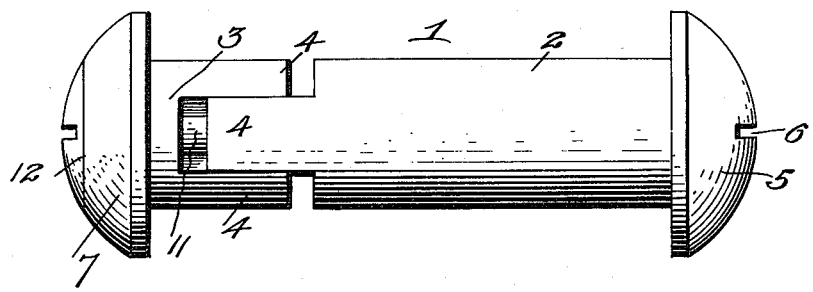
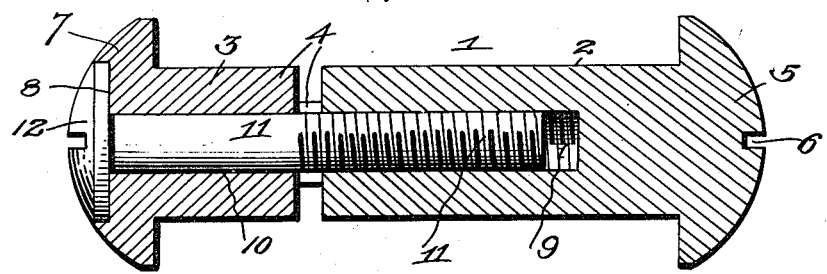
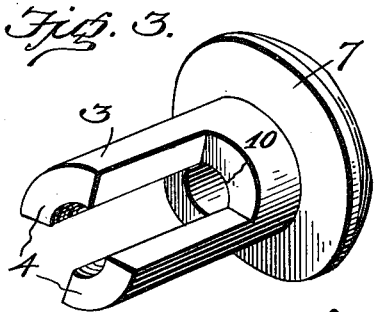
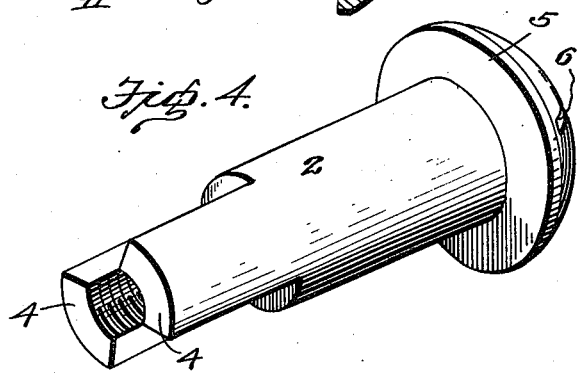
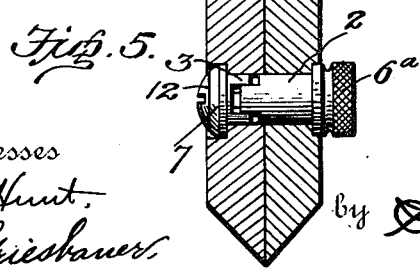
Witnesses
C. E. Hunt.
C. H. Grieshaver.
Inventor
Leonard F. Schmidt.
by H. B. Willson & Co.
Attorneys

UNITED STATES PATENT OFFICE.

LEONARD F. SCHMIDT, OF MINERSVILLE, PENNSYLVANIA, ASSIGNOR OF ONE-THIRD TO JACOB ROEMER AND ONE-THIRD TO HARRY BETTINGER, OF MINERSVILLE, PENNSYLVANIA.

CLUTCH-BOLT.

953,298. Specification of Letters Patent. Patented Mar. 29, 1910.

Application filed May 20, 1909. Serial No. 497,290.

*To all whom it may concern:*

Be it known that I, LEONARD F. SCHMIDT, a citizen of the United States, residing at Minersville, in the county of Schuylkill and State of Pennsylvania, have invented certain new and useful Improvements in Clutch-Bolts; and I do declare the following to be a full, clear, and exact description of the invention, such as will enable others skilled in the art to which it appertains to make and use the same.

This invention relates to improvements in clutch bolts.

The object of the invention is to provide a bolt of this character which is so constructed that the threaded portion thereof will be covered and protected and so arranged that the head of the threaded portion will not come into engagement with the moving part of the object with which it is engaged, thereby obviating the liability of the bolt becoming loose.

A further object is to provide a bolt of this character which may be readily adjusted to take up lost motion due to wear or other causes, and by means of which the use of washers may be dispensed with.

With the foregoing and other objects in view, the invention consists of certain novel features of construction, combination and arrangement of parts, as will be more fully described and particularly pointed out in the appended claims.

In the accompanying drawings, Figure 1 is a side view of a bolt constructed in accordance with the invention; Fig. 2 is a longitudinal sectional view of the same; Fig. 3 is a perspective view of the cap member of the bolt looking toward the inner end of the same; Fig. 4 is a similar view of the opposite end of the bolt; Fig. 5 is a sectional view through the blades of a pair of shears showing one application or use of the bolt.

My improved bolt comprises an outer casing member 1 which is formed in separable sections 2 and 3, said sections having on their inner or engaging ends an adjustable clutch connection said connection comprising pairs of lugs 4, the inner side edges of which are preferably formed at oblique angles. The lugs 4 of the sections 2 and 3 are arranged at diametrically opposite points and the lugs of one of the sections are so arranged with respect to the lugs of the other section that when the ends of said sections are brought together, an interlocking engagement will be provided between the sections of the casing. The lugs 4 are preferably of sufficient length to permit the sections 2 and 3 of the casing to be adjusted longitudinally, thus providing for the lengthening or shortening of the bolt.

The casing member 2 is provided with a head 5 in which may be formed a screwdriver slot 6 or which may be provided with a milled extension 6ª, as shown in Fig. 5 of the drawings, while the section 3 of the casing is provided with a head 7, in the outer end of which is arranged a countersunk seat 8 the purpose of which will hereinafter appear. In the section 2 of the bolt is formed an interiorly threaded socket 9 while in the section 3 is formed a longitudinally disposed passage 10 which is extended through the head of the section and connects with the countersunk seat or recess 7 of the head.

The sections 2 and 3 of the casing are secured together in operative engagement by means of a connecting screw 11, which is adapted to be inserted through the passage 10 of the section 3 of the casing and screwed into the threaded socket 9 of the section 2 of the casing thereby adjustably securing the two sections of the casing together. When the screw is thus engaged with the sections of the casing, the head 12 of the screw will fit into the recess or seat 8 in the head 7.

A bolt constructed as herein shown and described may be employed for the same uses or in the same capacity in which the ordinary form of bolt is employed, but is particularly adapted for use as a pivot bolt or a clamping bolt, and may be used as shown in Fig. 5 of the drawings or as a spindle or axle bolt for children's carriages or the like, in which uses it will be noted that the movable parts of such objects do not come into contact with any portion of the connecting screw of the bolt sections. The bolt will also be found advantageous for use as a clamping bolt for attaching saw handles to the saw blades or for similar purposes.

From the foregoing description, taken in connection with the accompanying drawings, the construction, and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

A bolt of the character described comprising a casing formed in longitudinally adjustable sections, one of which is provided with a threaded socket and the other with a smooth bore or passage, heads on the outer ends of said sections, and a connecting screw inserted through the bore of one of said sections and adapted to be screwed into the threaded socket of the adjoining section whereby said sections may be adjustably secured together.

In testimony whereof I have hereunto set my hand in presence of two subscribing witnesses.

LEONARD F. SCHMIDT.

Witnesses:
CHAS. W. KIMMELL,
JOHN F. NACE.